UNITED STATES PATENT OFFICE.

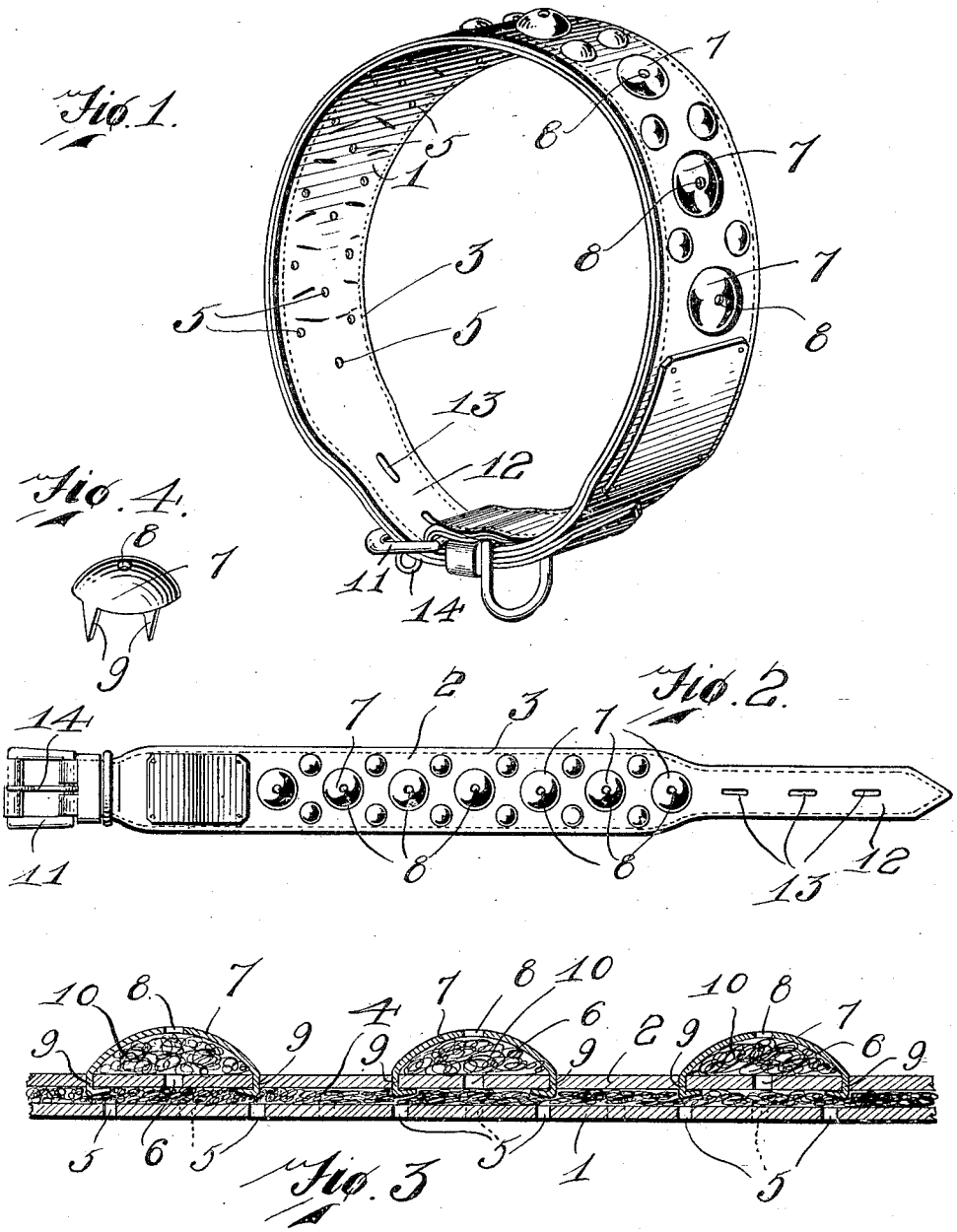

PASCHAL HUGHES, OF MARSHALL, MICHIGAN.

DOG-COLLAR.

1,127,249.  Specification of Letters Patent.  Patented Feb. 2, 1915.

Application filed April 3, 1914. Serial No. 829,289.

*To all whom it may concern:*

Be it known that I, PASCHAL HUGHES, a citizen of the United States, residing at Marshall, in the county of Calhoun and State of Michigan, have invented certain new and useful Improvements in Dog-Collars, of which the following is a specification, reference being had therein to the accompanying drawing.

This invention relates to dog collars and has for its object the production of a simple and efficient antiseptic dog collar which is provided with means for retaining a flea exterminating fluid within the collar.

Other objects and advantages of the present invention will appear throughout the following specification and claim.

In the accompanying drawing:—Figure 1 is a perspective view of the collar. Fig. 2 is a top plan view of the collar in a stretched out condition. Fig. 3 is a longitudinal section through the collar. Fig. 4 is a perspective view of one of the studs used in connection with the collar.

By referring to the drawings it will be seen that the collar comprises an inner layer 1 and an outer layer 2, which layers are stitched along their respective edges as indicated at 3 in Figs. 1 and 2. The space between the inner and outer layers 1 and 2 is filled with absorbent cotton or other fibrous material 4 and the inner layer 1 of the collar is provided with a plurality of apertures 5 to allow the antiseptic fluid to pass through the inner layer 1 of the collar. The outer layer 2 of the collar is provided with a plurality of apertures 6, and over these apertures 6 is placed a metallic stud 7 preferably formed of brass or other suitable metal, and this stud 7 is provided with a fluid entrance aperture 8 upon the top thereof. The stud 7 is provided along its edges with a plurality of spurs 9, which spurs are adapted to be bent inwardly as indicated clearly in Fig. 3 of the drawing to efficiently hold the stud 7 in firm engagement with the outer layer 2 of the collar. A packing of fibrous material 10 is placed within the stud 7 as is clearly illustrated in Fig. 3 and is adapted to receive a disinfectant liquid which may be used in connection with the collar. It should be understood that the liquid may be poured into the collar through the aperture 8 and saturate the fibrous material 10, and may also pass through the apertures 6 and saturate the fibrous material 4 contained between the inner and outer layers 1 and 2. The disinfectant liquid will then pass out through the apertures 5 upon the neck of the dog or animal wearing the collar.

The collar is provided at one end with the usual buckle 11 and at the other end with a reduced projecting end 12 having the aperture 13 formed therein for receiving the tongue 14 of the buckle 11.

From the foregoing description it will be seen that a very simple and efficient means has been produced for containing disinfectant liquid or a flea exterminating compound within the collar, and further that a very simple and efficient means has been produced for facilitating the applying of the liquid to the collar. The studs 7 by being formed in the usual manner will constitute a decorative means for the collar as well as perform a function for facilitating the entrance of liquid into or between the series of layers of the collar.

Having thus described the invention what is claimed as new, is:—

A collar comprising an inner and outer layer being stitched along their respective edges, a fibrous filler placed between said inner and outer layers, said inner layer being provided with a plurality of apertures, said outer layer being also provided with a plurality of apertures, metal studs fitting over said apertures, each metal stud provided with a plurality of depending prongs passing through said outer layer and being clenched for constituting an efficient means for holding said studs upon said collar, said studs being provided with apertures for the purpose of admitting liquid into said collar, and a fibrous material placed within said studs.

In testimony whereof I hereunto affix my signature in presence of two witnesses.

PASCHAL HUGHES.

Witnesses:
 BLAINE W. HATCH,
 JESSE M. HATCH.